Oct. 7, 1969

B. KOTZIN, JR 3,470,577

ROLLER STRUCTURE

Filed July 6, 1966

INVENTOR
BERNARD KOTZIN, JR.
BY
EDWARD D. O'BRIAN
ATTORNEY

United States Patent Office
3,470,577
Patented Oct. 7, 1969

3,470,577
ROLLER STRUCTURE
Bernard Kotzin, Jr., 7411 Flight Ave.,
Los Angeles, Calif. 90045
Filed July 6, 1966, Ser. No. 563,223
Int. Cl. B60b 33/00
U.S. Cl. 16—18                    2 Claims

ABSTRACT OF THE DISCLOSURE

This invention is directed to a roller structure, and particularly a roller structure which is arranged so that foreign material is inhibited from entering into the relatively rotating and stationary structure thereof. The inhibition for the entry of foreign material is provided by close fitting parts at some distance away from the relatively rotating parts. These close fitting parts thus prevent large foreign material from entering into the structure. Preferably, the roller structure of this invention comprises a roller with a journal therein. Journaled into the roller, and rotatable with respect to it, is a cylindrical tubular sleeve. The roller is rotatable on this sleeve. In the preferred embodiment this sleeve carries flanges which extend to position closely adjacent the roller, away from the bearing. This proximity prevents foreign material from entering into the journal bearing area. If desired, the tubular sleeve can be rotatably mounted upon an axle so that it acts as a bearing both on the inside and on the outside thereof. However, such is not necessary so long as adequate protection is provided for the main rolling journal of the roller.

Background

The roller of this invention is particularly designed for use in areas of textile treatment and similar areas of contamination. Rollers which are presently employed upon hand trucks which handle textile materials within a fiber or cloth mill, or in a cutting or sewing operation are subject to having the bearings clogged with lint so that they rapidly become difficult to rotate. Nothing has been able to satisfy the need for rollers which are useful in this type of environment, for which rollers should operate over long periods of time without lint clogging.

Description

In view of the fact that little has been done to provide a satisfactory roller for use in textile environments where lint is present and in similar problem areas, it is an objective of this invention to provide a roller which is properly designed so that it will not, over a long period of time, become inoperative through lint clogging. It is another object of this invention to provide a suitable roller for use in environments which contain large contaminants, which roller is protected against contamination which would result in locking the roller against rotation. It is a further object of this invention to provide a roller in which the rotative bearing is protected so that it has a long, trouble free life which produces economic operation through low maintenance. Other objects and advantages of this invention will become apparent from a study of the following portion of this specification, the claims and the attached drawings.

Figure 1:
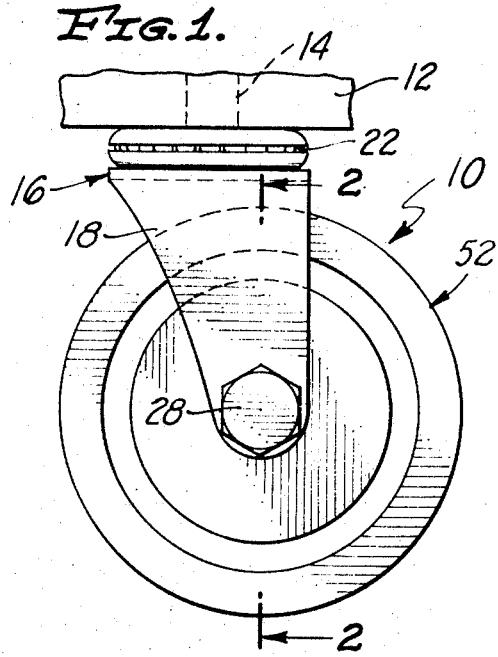
FIG. 1 is a side elevation of the preferred embodiment of the roller of this invention mounted in a caster mounting.
Figure 2:
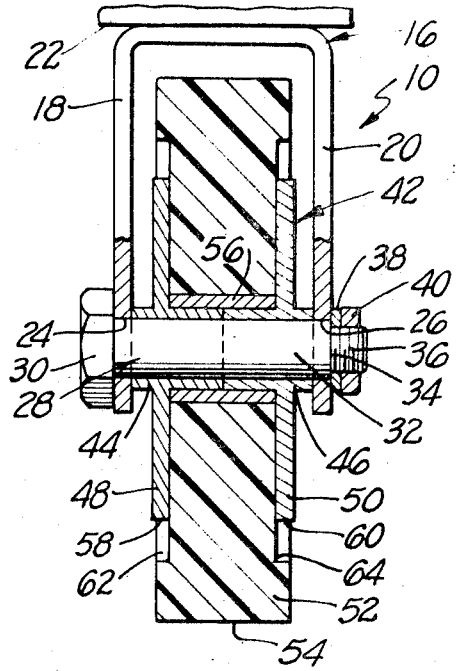
FIG. 2 is an enlarged, partial section taken generally along the line 2—2 of FIG. 1.

Referring now to the drawings, the roller of the preferred embodiment of this invention is generally indicated at 10. Roller 10 is designed for the rolling support of structure 12 with respect to a floor or other supporting means. The structure 12 may be any type of cart which may be adapted to carry equipment or goods. In the embodiment shown, roller 10 is mounted for castering. It has pin 14 which engages in a suitable hole in structure 12. Yoke 16 has horns 18 and 20. Yoke 16 is arranged for rotation about a vertical axis, the axis being the axis of pin 14. Bearing 22 permits this rotation. While roller 10 is shown as being arranged for castering, the mounting of the wheel in yoke 16 is the subject matter of this invention, so it is clear that the yoke 16 could be rigidly mounted upon structure 12.

Horns 18 and 20 terminate in aligned pivot pin openings 24 and 26. Pivot pin 28 passes through openings 24 and 26. The axis of pivot pin 28 is at right angles to and is nonintersecting with respect to the axis of pin 14. By this arrangement of axis, castering is accomplished. Pivot pin 28 is a shoulder bolt having head 30, cylindrical bearing area 32, shoulder 34 and threads 36. Head 30 engages on the outside of horn 18 while the cylindrical bearing area 32 is positioned inside of pivot pin openings 24 and 26. Shoulder 34 is aligned with the outside of horn 20. Washer 38 is placed outside of horn 20 and nut 40 retains the washer against shoulder 34 and against horn 20. The dimensions are such that horns 18 and 20 are not squeezed tight against roller assembly 42.

Roller assembly 42 comprises bearing sleeves 44 and 46 which extend outwardly into sliding bearing relationship with horns 18 and 20 and extend inwardly to contact each other. Bearing sleeves 46 and 48 are tubular and are cylindrical inside and out, preferably substantially concentrically. Shields 48 and 50 are preferably integrally formed with the identically formed bearing sleeves 44 and 46, respectively, and are generally in the form of discs which extend radially outwardly from the axis of sleeves 44 and 46 and of pivot pin 28. Wheel 52 has a substantially cylindrical outer surface 54 which is adapted for floor engagement and support of the entire structure. Wheel 52 is preferably made of rubber or synthetic polymer composition material for quietness of operation, and in such a case to improve its wearing quality it preferably has bushing 56 on the interior to serve as a bearing. The interior cylindrical bearing surface of bushing 56 is of such diameter so that it rolls properly on bearing sleeves 44 and 46. Shields 48 and 50 are flat so that their entire surfaces and outer peripheral edges 58 and 60 lie closely adjacent the axial ends of wheel 52. Recesses 62 and 64 may be provided in the axial ends of wheel 52 to accept edges 58 and 60. Furthermore, these recesses may closely radially fit these edges so as to provide additional sealing.

It is seen from this construction that there are two relatively rotatable bearings between wheel 52 and yoke 16. Bushing 56 can rotate on bearing sleeves 44 and 46, and bearing sleeves 44 and 46 can rotate upon pivot pin 28. Jamming of shields 48 and 50 by lint accumulation between them and horns 18 and 20 is minimzed by the tubular extension of sleeves 44 and 46 outside of shields 48 and 50. Thus, lint accumulates between shields 48 and 50 and the adjacent horns to prevent rotation of bearing sleeves 44 and 46 with respect to pivot pin 28, and wheel 52 can still rotate by means of its bushing 56 rotating upon the bearing sleeves. That bearing is protected by the position of the shields 48 and 50 against the axial ends of wheel 52. This closeness prevents contamination from entering into this latter bearing.

Figure 3:
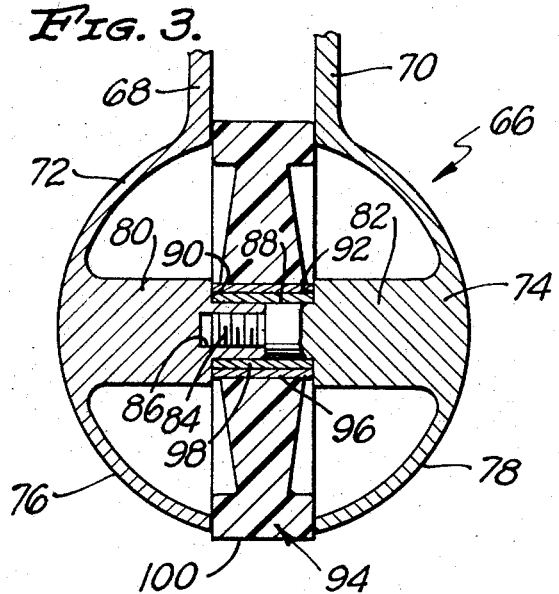
FIG. 3 is a generally axial section taken through another embodiment of the roller of this invention.

A further embodiment of the roller structure of this invention is indicated at 66 in FIG. 3. The roller structure 66 includes horns 68 and 70 of a yoke, such as the horns on yoke 16. These horns may be arranged for castering action of the roller structure 66, or may be rigidly affixed to the structure which is to be made movable. As is seen in FIG. 3, horns 68 and 70 are respectively integral with shields 72 and 74. These shields respectively have smooth, preferably rounded, exterior surfaces 76 and 78. As shown, surfaces 76 and 78 are each substantially hemispherical, but can be any other convenient and preferably smooth shape. Shields 72 and 74 respectively carry interior studs 80 and 82 which screw together by means of male threaded portion 84 on stud 82 engaging into threaded socket 86 on stud 84. Furthermore studs 80 and 82 join together to provide bearing 88, which is split in the middle and half of which is provided on each stud. Bearing 88 is limited upon its ends by shoulders 90 and 92 which act to axially position wheel 94. Wheel 94 has a bushing 96 therein which rotates with the wheel and serves as a wear resistant, low friction bearing. Bushing 96 is also of such dimension as to slidingly engage with shoulders 90 and 92 so as to axially position the wheel 94. Sleeve 98 is rotatably positioned interiorly in bushing 96 and exteriorly of bearing surface 88. Sleeve 98 thus provides a double bearing which can permit wheel 94 to turn either interiorly or exteriorly thereof. Thus, double, concentric bearing surfaces are available so that if one becomes inoperative, the other permits wheel rotation. It is to be noted that the close clearance between shields 72 and 74 in the axial direction of wheel 94 inhibits the entry of foreign matter so that this double bearing is additionally protected. External cylindrical surface 100 of wheel 94 extends sufficiently beyond shields 72 and 74 to permit normal rolling of the wheel over support surfaces.

By this construction, roller 10 and roller 66 are both strongly resistant to inhibition of rotation. This is accomplished both by guarding of the bearing surfaces by the closely fitting shields to prevent the entrance of contaminants and by providing a double concentric bearing so that either may rotate. It is clear that the roller structure of this invention is particularly adaptable for use in those environments where contamination is present. Furthermore, the rollers are designed to prevent the entrance of contamination particles of relatively large size as well as small contamination. In fact, it is in the textile industry where the rollers of this invention are most particularly useful for they resist the catching and winding up of thread which stops rotation of other rollers, and if thread should get wound in parts thereof, the double bearing permits the roller to continue free rotation. Thus, the roller is particularly useful in textile operations and in other fields.

This invention having been described in its preferred embodiment, it is clear that it is susceptible to numerous modifications and embodiments within the skill of the routing artisan and without the exercise of the inventive faculty.

I claim:
1. A roller structure, said roller structure comprising:
   a pivot pin formed of first and second separable halves, said pivot pin having an axis and an outer bearing surface thereon, said pivot pin being adapted to be mounted upon a structure,
   a tubular bearing sleeve mounted on said pivot pin, said bearing sleeve being rotatable with respect to the axis of said pivot pin,
   a wheel, said wheel having an interior bearing surface, said interior bearing surface of said wheel embracing said bearing sleeve so that said wheel is rotatably mounted with said pivot pin,
   said wheel having an outer surface which is substantially circular about said axis, said outer surface being adapted for floor engagement to support the structure with respect to the floor, said wheel being adapted to rotate about said pivot pin by means of both the interior and exterior bearing surfaces on said bearing sleeve,
   a shield mounted on each of said pivot pin halves, said shields extending away from said bearing sleeve and extending into proximity with respect to said wheel so as to inhibit contaminants from reaching said bearing sleeve.
2. A roller structure as claimed in claim 1 including: means for mounting said roller structure located on said shields.

References Cited
UNITED STATES PATENTS

| 1,780,761 | 11/1930 | Naschke | 16—46 |
| 2,996,752 | 8/1961 | Pope | 16—18 |
| 3,127,632 | 4/1964 | Rice et al. | 16—18 |

FOREIGN PATENTS

| 1,128,111 | 8/1956 | France. |

DONALD A. GRIFFIN, Primary Examiner